Feb. 7, 1928.

J. A. YERKES ET AL 1,658,424

VALVE ABUTMENT

Filed Sept. 20, 1926

INVENTORS
JOHN A. YERKES
BY REES H. LEMMON
Nestall and Wallace
ATTORNEYS.

Patented Feb. 7, 1928.

1,658,424

UNITED STATES PATENT OFFICE.

JOHN A. YERKES AND REES H. LEMMON, OF LONG BEACH, CALIFORNIA.

VALVE ABUTMENT.

Application filed September 20, 1926. Serial No. 136,687.

This invention relates to a stop for a check valve which valve is mounted so as to be free to move with respect to its seat, the upward or unseating travel of the valve being limited.

In the operation of deep well pumps and like structures, ball check valves are employed, the valve being mounted in cages of tubular form. Sufficient clearance is provided about the ball when unseated to permit the flow of the oil being pumped. However, the structure is such that the ball must be limited as to its upward travel. It is the current practice to interpose a stop in the path of the ball, the stop being secured to the cage. The ball engages the stop with an impact of great magnitude and often ruptures and breaks the latter. The objects of this invention are first, to provide a stop structure which will withstand heavy blows; second, to provide a valve abutment which is insertable in a cage and replaceable; and third, to provide a structure of the character described, which is simple, economical to manufacture, durable in use and offers a minimum of resistance to the flow of liquid through the cage.

Figure 1:
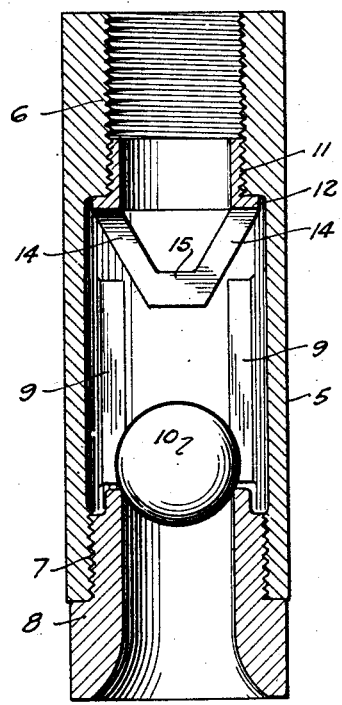
Figure 2:
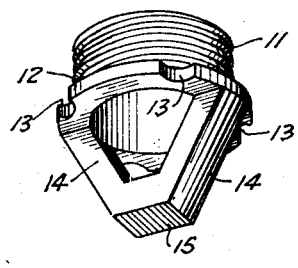

These objects together with other objects and corresponding accomplishments, are obtained by means of the embodiment of our invention illustrated in the accompanying drawing, in which:

Fig. 1 is an axial section of a cage and ball valve with an insertable valve stop mounted therein; and Fig. 2 is a perspective view of the valve stop as shown detached.

Referring more particularly to the drawing, a tubular valve cage 5 is shown. The bore of the cage is reduced in diameter at the top and internally threaded as indicated by 6 to provide for attachment to a desired portion of the pump structure. The bore at the bottom is internally threaded as indicated by 7 to receive a shoe 8 provided with a seat at the upper end for a ball. Ribs 9 triangular in cross section extend longitudinally of the bore with their tops or apices disposed inwardly so as to engage the ball and hold the latter in alignment with its seat during its reciprocation. These ribs are preferably cast integral with the cage. The usual ball 10 is mounted on the seat and is restrained laterally by the ribs, its upward travel being limited by a stop.

The stop comprises a collar 11 externally threaded and adapted to be inserted in the bore 6. Outstanding from the collar 11 is a flange 12 adapted to rest against the shoulder formed in the bore. To provide for obtaining a grip upon the stop to aid in insertion and removal of same, recesses 13 in the periphery of the flange are provided. Extending downwardly from the flange is the abutment bridge consisting of legs 14 spread apart and joined by a cross portion 15.

The cross portion 15 provides a surface against which the ball 10 may strike. The legs 14, serve as struts to transmit the stresses to the cage. It will be noted that the bridge resists the blows by reason of the compression strains upon the legs 14. Where a bar is extended across the bore in a straight line, the bar acts as a beam. Bending stresses are placed on such a bar and the bar does not have as great a resistance to breaking as the type of bridge disclosed in the present application.

What we claim is:

In combination with a tubular valve cage for a check valve having a shoulder in the bore at the upper end of the travel of the valve, a detachable stop having a collar threadedly mounted in the bore of said valve cage and provided with a flange engaging said shoulder, a bridge extending across the bore of said collar and integral with said collar, said bridge having steeply inclined strut portions at its ends and a short horizontal portion, the inclination of the strut portions being such that their inner faces if produced would meet at a point within said horizontal portion, whereby the impact of the valve comes directly on said struts and is transmitted by them to said shoulder.

In witness that we claim the foregoing we have hereunto subscribed our names this 31st day of August, 1926.

REES H. LEMMON.
JOHN A. YERKES.